United States Patent [19]

Kuroshita

[11] Patent Number: 5,550,807
[45] Date of Patent: Aug. 27, 1996

[54] METHOD OF MEASURING DISTANCE BETWEEN EQUIPMENTS ON LAN AND DISTANCE MEASURING APPARATUS

[75] Inventor: Kazumasa Kuroshita, Kawasaki, Japan

[73] Assignee: Fujitsu Limited, Kanagawa, Japan

[21] Appl. No.: 313,438

[22] Filed: Sep. 27, 1994

[30] Foreign Application Priority Data

Mar. 4, 1994 [JP] Japan .................... 6-034519

[51] Int. Cl.$^6$ ............................. H04J 3/24; H04L 12/46
[52] U.S. Cl. .................. 370/17; 370/94.1; 370/85.13; 340/825.54; 364/562; 364/569
[58] Field of Search ............... 370/13, 131, 17, 370/85.1, 85.13, 94.1; 340/825.06, 825.15, 825.17, 825.49, 825.54, 825.55; 364/561, 569; 379/25; 342/125

[56] References Cited

U.S. PATENT DOCUMENTS

| | | | |
|---|---|---|---|
| 4,896,315 | 1/1990 | Felker et al. | 370/17 |
| 5,048,009 | 9/1991 | Conrad | 370/13 |
| 5,198,805 | 3/1993 | Whiteside et al. | 370/17 |
| 5,226,120 | 7/1993 | Brown et al. | 395/200 |
| 5,247,464 | 9/1993 | Curtis | 370/17 |
| 5,287,343 | 2/1994 | Nakamura et al. | 370/13.1 |
| 5,365,509 | 11/1994 | Walsh | 370/13 |

FOREIGN PATENT DOCUMENTS 1236417  9/1989  Japan .

Primary Examiner—Hassan Kizou

[57] ABSTRACT

In measuring the distance and the positional relationship between the equipments on a LAN, a first equipment transmits a request packet to each of the other equipments at a predetermined interval of time. When each of the other equipments receives the request packet, it supplies the response packet to the first equipment. The first equipment calculates the distance between the first equipment and each of the other equipments on the basis of the time at which the request packet has been transmitted and the time at which the response packet has been received, and stores the calculated distance in the network structure information table NWT. Since the packet transmission speed changes in accordance with the traffic volume, the calculated distance is compared with the distance stored in the network structure information table NWT, and only when the calculated distance is shorter, it is stored in the network structure information table NWT.

10 Claims, 17 Drawing Sheets

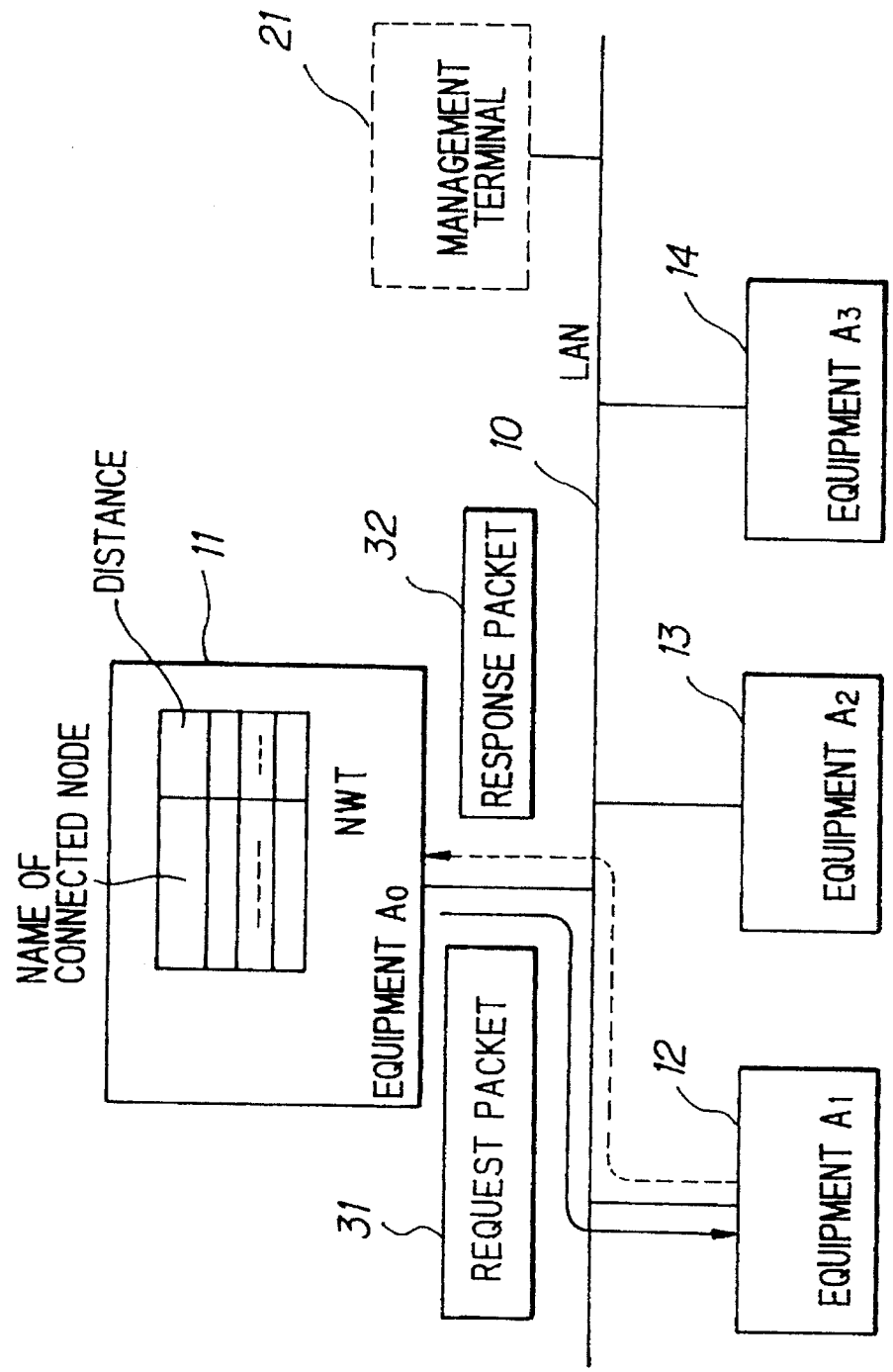

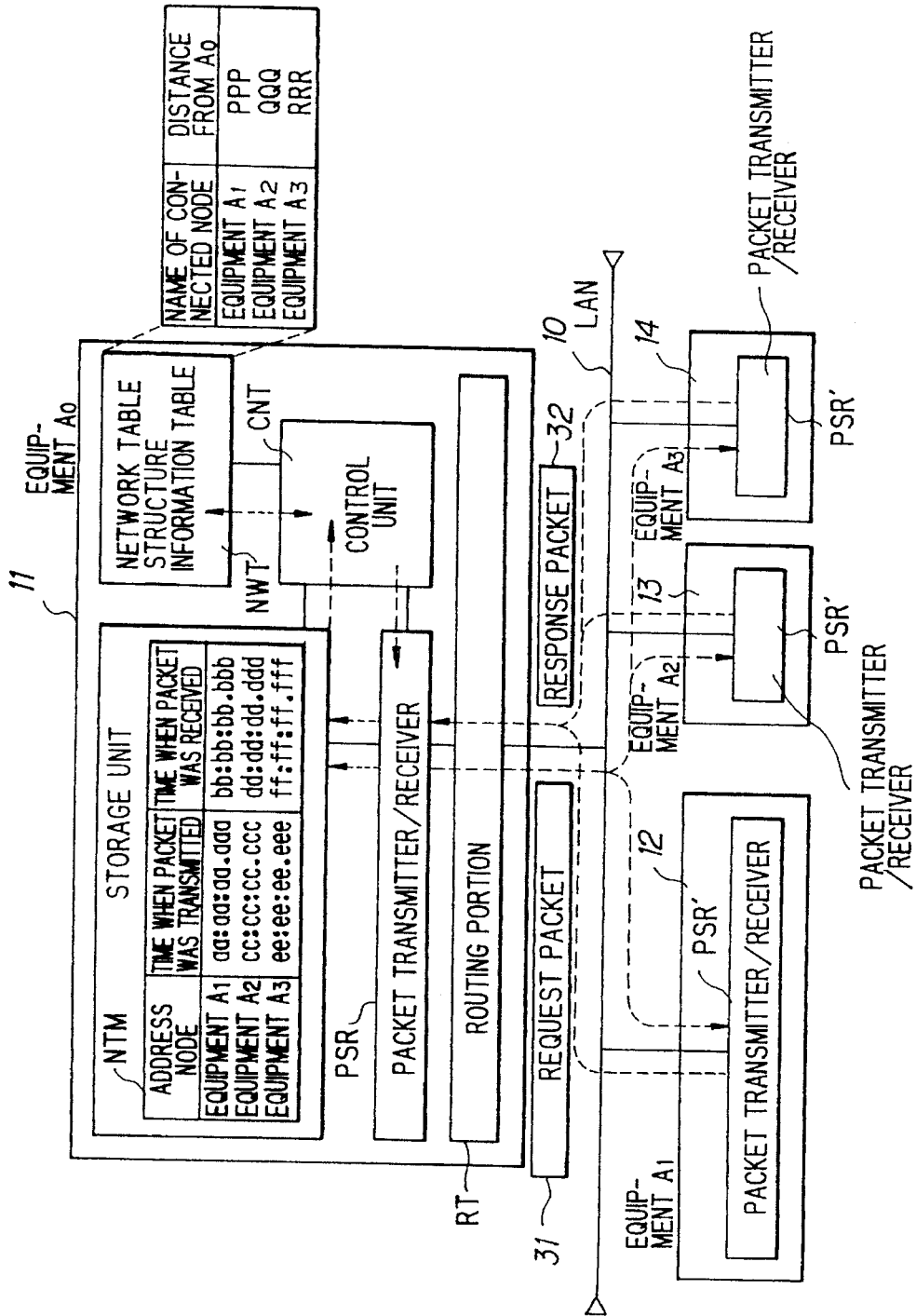

BUS TYPE NETWORK

STAR TYPE NETWORK

RING TYPE NETWORK

ACTUAL NETWORK STRUCTURE

CONVENTIONAL DISPLAY NETWORK STRUCTURE

METHOD OF MEASURING DISTANCE BETWEEN EQUIPMENTS ON LAN AND DISTANCE MEASURING APPARATUS

BACKGROUND OF THE INVENTION

1. Field of the Invention

The present invention relates to a method and apparatus for measuring the distance between the equipments on a LAN and detecting the positional relationship between the equipments and, more particularly, to a method and an apparatus for measuring the distance between the equipments on a LAN and detecting the positional relationship between the equipments by collecting and analyzing, by one equipment on the LAN, the information on the other equipments connected thereto on the same LAN.

With the recent demand for common use of resources such as a file and a printer, and the recent demand utilization of data communication, a LAN has increasingly come into wide use. A conventional LAN copes with an increase in the number of ports by utilizing a star type network realized by connecting a hub to a trunk line of a cascade connection of a hub. In addition, a plurality of LANs are connected with each other or a hierarchical network is constructed by utilizing an intermediate apparatus for LAN—LAN connection such as a bridge, a router and a brouter.

As a LAN wiring topology, there are (a) a bus type network, (b) a star type network, and (c) a ring type network as shown in FIG. 16. The bus type network is often seen in a LAN using a coaxial cable ACL. In the star type network, equipments are connected in the shape of a star with an equipment CH called a concentrator or a hub as a center. In the ring type network, adjacent stations STs are directly connected with each other, thereby forming a ring.

With a rapid increase in the scale and the zone of a LAN, much importance has been attached to network management. A protocol for network management such as an SNMP (Simple Network Management Protocol) and a CMIP (Common Management Information Protocol) is standardized and many networks are managed by using these protocols. The SNMP is a protocol exclusively for concentrated management of the equipments constituting a LAN. The SNMP conducts managements such as (1) statistics management of traffic (number of Ethernet packets, number of errors, number of collisions, etc.), (2) management of record data (data value showing the state of the network during a specific time), (3) alarm management (4) host top N management (data for ranking hosts on the basis of values of a statistic item. This is used, for example, to examine N nodes which have transmitted the largest number of data on a specific day.)

In this way, a network management protocol is standardized, but a method of seizing the distance between the equipments on a LAN or a method of detecting the positional relationship thereof has not been established yet. Therefore, a network supervisor cannot grasp the actual layout of the network from a conventional network management application. For example, even when equipments A, B, C and D and a management terminal MU are connected to a LAN in the positional relationship and at the distances shown in FIG. 17A, the network structure is displayed on a screen as shown in FIG. 17B. That is, it is impossible to draw the network structure corresponding to the actual layout on a display screen.

In addition, in a conventional LAN network system, since it is impossible to seize the distance between the equipments, even when the distance between equipments exceeds a preset value, the management terminal is not informed of the fact, or it is impossible to take a measure to prevent a trouble such as a signal attenuation caused by the prolonged distance.

It is also impossible to detect a trouble such as a cable missing and a trouble in an equipment of the LAN in its early stages.

SUMMARY OF THE INVENTION

Accordingly, it is an object of the present invention to eliminate the above-described problems in the related art and to provide a method and an apparatus for measuring the distance between the equipments on a LAN and detecting the positional relationship between the equipments on a LAN with easiness.

It is another object of the present invention to provide a method of drawing the network structure of a LAN on a display screen in correspondence with the actual layout (distance, positional relationship).

It is still another object of the present invention to provide a method of detecting the fact that the distance between equipments on a LAN exceeds a preset value or a cable missing with easiness.

To achieve these aims, in a first aspect of the present invention there is provided a method of measuring the distance between the equipments on a LAN, comprising the steps of: transmitting a request packet for requesting a response packet from a first equipment on the LAN to each of the other equipments; transmitting a response packet from each equipment which has received the request packet to the first equipment; calculating by the first equipment the distance between the first equipment and each of the other equipments on the basis of the time at which the request packet has been transmitted and the time at which the response packet has been received; storing the calculated distance in a memory; and drawing the network structure of the LAN on a display screen on the basis of the distance between the equipments.

In a second aspect of the present invention, there is provided a method of measuring the distance between the equipments on a bus LAN, comprising the steps of: calculating by a first equipment and a second equipment on the LAN the distance between the first equipment and each of the other equipments and the distance between the second equipment and each of the other equipments; obtaining the distance and the positional relationship between the equipments on the basis of the distances calculated by the first and the second equipments; and drawing the network structure of the LAN on a display screen on the basis of the distance and the positional relationship between the equipments.

In a third aspect of the present invention, there is provided a method of measuring the distance between the equipments on a LAN, comprising the steps of: transmitting a request packet for requesting a response packet from each intermediate apparatus for LAN—LAN connection to each equipment on the LAN under its command and an adjacent intermediate apparatus; transmitting a response packet from each equipment which has received the request packet to the intermediate apparatus which has transmitted the request packet; calculating by the intermediate apparatus the distance between the apparatus and each equipment on the LAN under its command and the distance between the apparatus and the adjacent intermediate apparatus on the basis of the time at which the request packet has been transmitted and the time at which the response packet has been received; storing the calculated distances in a memory; calculating by a management equipment on a LAN the distance between the equipments on each LAN on the basis of the distance information collected by each intermediate apparatus; and drawing the network structure of the LANs on a display screen on the basis of the distance between the equipments.

Apparatuses for executing these methods are also provided in the present invention.

Other features and advantages of the present invention will be apparent from the following description taken in conjunction with the accompanying drawings.

BRIEF DESCRIPTION OF THE DRAWINGS

FIG. 1 schematically explains the principle of the present invention;

FIG. 3 is a detailed view of the LAN system shown in FIG. 2A;

DESCRIPTION OF THE PREFERRED EMBODIMENT (A) Schematic explanation of the present invention FIG. 1 is a schematic explanatory view of the principle of the present invention.

Figure 2A:
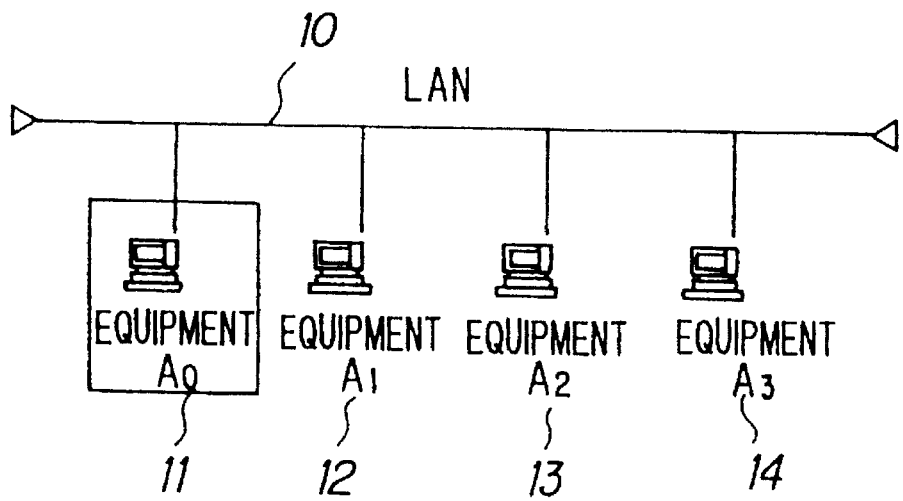
FIGS. 2A and 2B show the structure of a LAN system to which a first embodiment of the present invention is applicable.

The reference numeral 10 represents a LAN, 11 to 14 equipments connected to the LAN 10, 21 a management terminal provided on the LAN 10, 31 a request packet for requesting a response packet, and 32 a response packet. The symbol NWT represents a network structure information table for storing the distance between the first equipment 11 and each of the other equipments 12 to 14.

The request packet 31 is transmitted from the first equipment 11 to each of the other equipments 12 to 14 at a predetermined interval of time. When each of the other equipments 12 to 14 receives the request packet 31, it supplies the response packet 32 to the first equipment 11.

The first equipment 11 calculates the distance between the first equipment 11 and each of the other equipments 12 to 14 on the basis of the time at which the request packet 31 has been transmitted and the time at which the response packet 32 has been received, and stores the calculated distance in the network structure information table NWT. In this case, since the packet transmission speed changes in accordance with the traffic volume, the calculated distance is compared with the distance stored in the network structure information table NWT, and only when the calculated distance is shorter, it is stored in the network structure information table NWT.

In this way, since it is possible to seize the distance between the equipments, the management terminal 21 can draw the network structure which corresponds to the actual layout by utilizing the distance information stored in the equipment 11. It is also possible to detect a cable missing or the occurrence of a trouble by judging whether or not the distance between any two equipments on a LAN is within a preset value and whether or not there is a response.

When the LAN is a bus type network, it is impossible to know the horizontal positional relationship of the equipments merely from the distance. In this case, a second equipment, for example, the equipment 12 is also used to measure the distance between the second equipment 12 and each of the other equipments 11, 13 and 14 and the distances calculated by the first and the second equipments 11, 12 are stored in the network structure information table NWT. The management terminal 21 on the LAN obtains the positional relationship and the distance between the equipments on the basis of the distances measured by the first and the second equipments 11, 12. In this way, it is possible to correctly seize the positional relationship and the distance between the equipments in the bus type LAN.

When a plurality of LANs are connected to each other through an intermediate apparatus for LAN—LAN connection, each intermediate apparatus calculates the distance between the apparatus and each equipment on the LAN under its command and the distance between the apparatus and an adjacent intermediate apparatus and stores the calculated distances in a memory. The management terminal on a LAN seizes the distance and the positional relationship between the equipments on each LAN on the basis of the distance information collected by each intermediate apparatus for LAN—LAN connection. In this way, it is possible to correctly seize the positional relationship and the distance between the equipments by measuring the distance between the equipments in the LAN system containing intermediate apparatus for LAN—LAN connection such as a hub, a bridge and a router.

(B) First embodiment (a) Structure

Figure 2B:
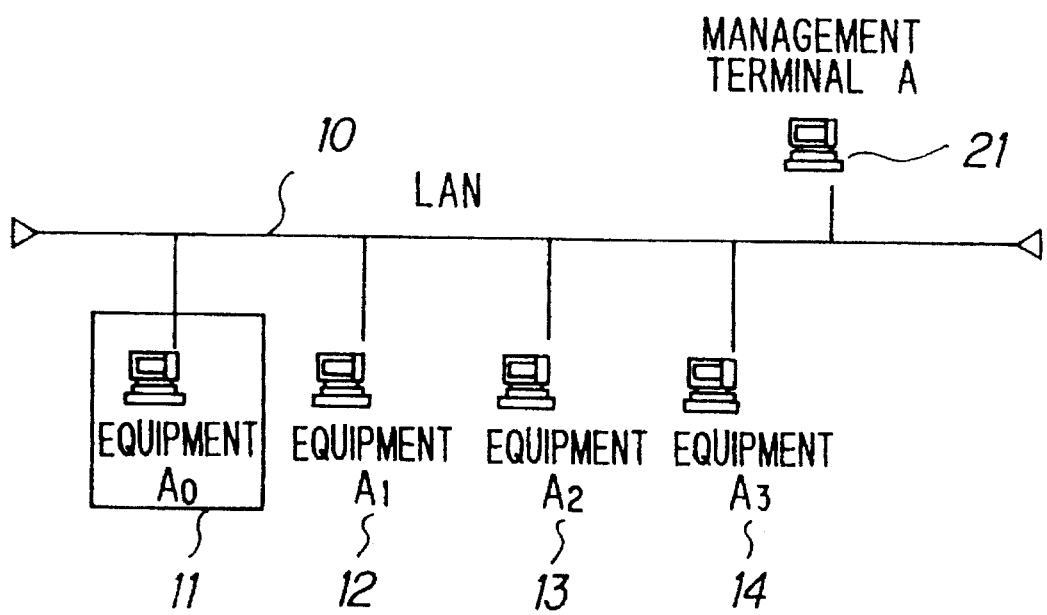

FIGS. 2A and 2B show the structure of a LAN system to which the present invention is applicable, wherein the LAN system shown in FIG. 2A has no management terminal, while the LAN system shown in FIG. 2B has a management terminal. The reference numeral 10 represents a LAN, 11 to 14 equipments ($A_0$ to $A_3$) connected to the LAN 10, and 21 a management terminal provided on the LAN 10.

FIG. 3 is a detailed view of the equipment 11 in FIG. 2A. In the equipment 11, the symbol RT represents a routing portion, PSR a packet transmitter/receiver for transmitting a request packet 31 for requesting a response packet and receiving a response packet 32, NTM a storage unit for storing the name of the address node (MAC address), and the time at which the request packet 31 has been transmitted and the time at which the response packet 32 has been received, NWT a network structure information table for storing the distance between the equipment 11 and another equipment in correspondence with the name of the address node (MAC address), and CNT a control unit for executing the distance measurement processing and other processing which will be described later. In the equipments 11 to 14, the symbol PSR' represents a packet transmitter/receiver for receiving the request packet 31 and transmitting the response packet 32.

The control unit CNT of the equipment 11 creates the request packet 31 at a predetermined interval of time, transmits the request packet 31 to the other equipments 12 to 14 through the packet transmitter/receiver PSR, and stores the time at which the request packet 31 has been transmitted in the storage unit NTM.

When each of the equipments 12 to 14 receives the request packet 31 through the packet transmitter/receiver PSR', it creates the response packet 32 and transmits the response packet 32 to the equipment 11 through the packet transmitter/receiver PSR'.

The equipment 11 calculates the distance between the equipment 11 and each of the equipments 12 to 14 on the basis of the time at which the request packet 31 has been transmitted and the time at which the response packet 32 has been received, and stores the calculated distance in the network structure information table NWT. In this case, since the packet transfer speed changes due to the occurrence of a collision or in accordance with the traffic volume, the calculated distance is compared with the distance stored in the network structure information table NWT, and only when the calculated distance is shorter, it is stored in the network structure information table NWT.

(b) Frame

Figure 4:
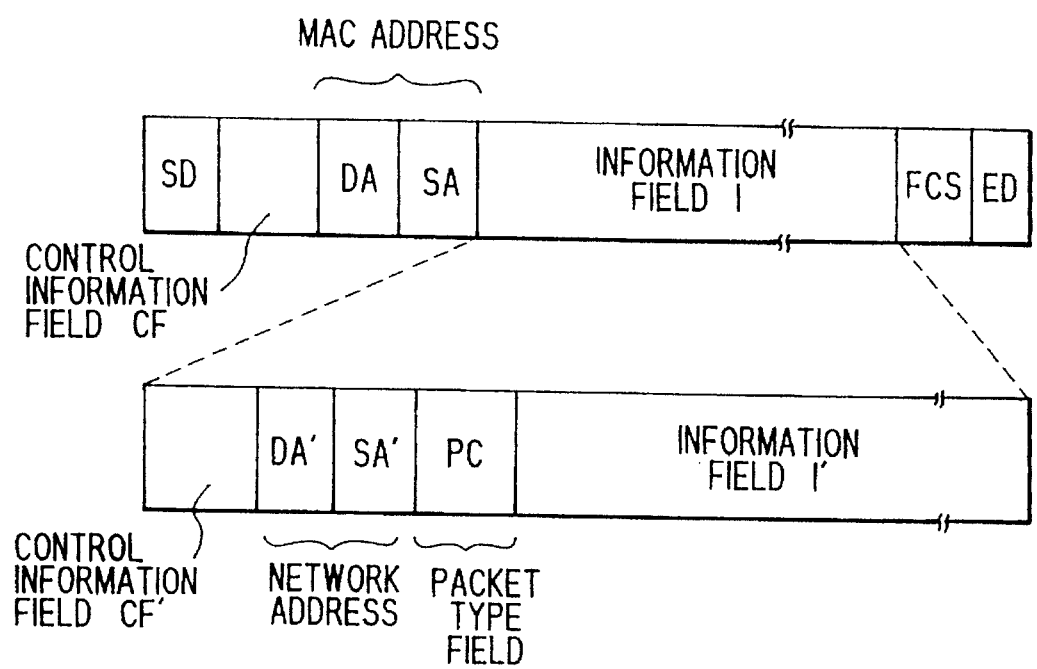
FIG. 4 shows the structure of a frame.

FIG. 4 shows the fundamental structure of a frame.

A start delimiter SD, an end delimiter ED, a control field, MAC addresses in layer 2 (destination address DA, source address SA), an information field I and a frame check sequence FCS are arranged in a frame. A packet type field PC of 2 bits is provided in an appropriate portion of the information field I so as to discriminate between the request packet 31 and the response packet 32. The information field I is subdivided so into a control information field CF', a destination address DA' as the network address (IP address), a source address SA' and an information field I'. The information field I is transmitted in the form of a packet.

(c) Distance measurement processing

Figure 5:
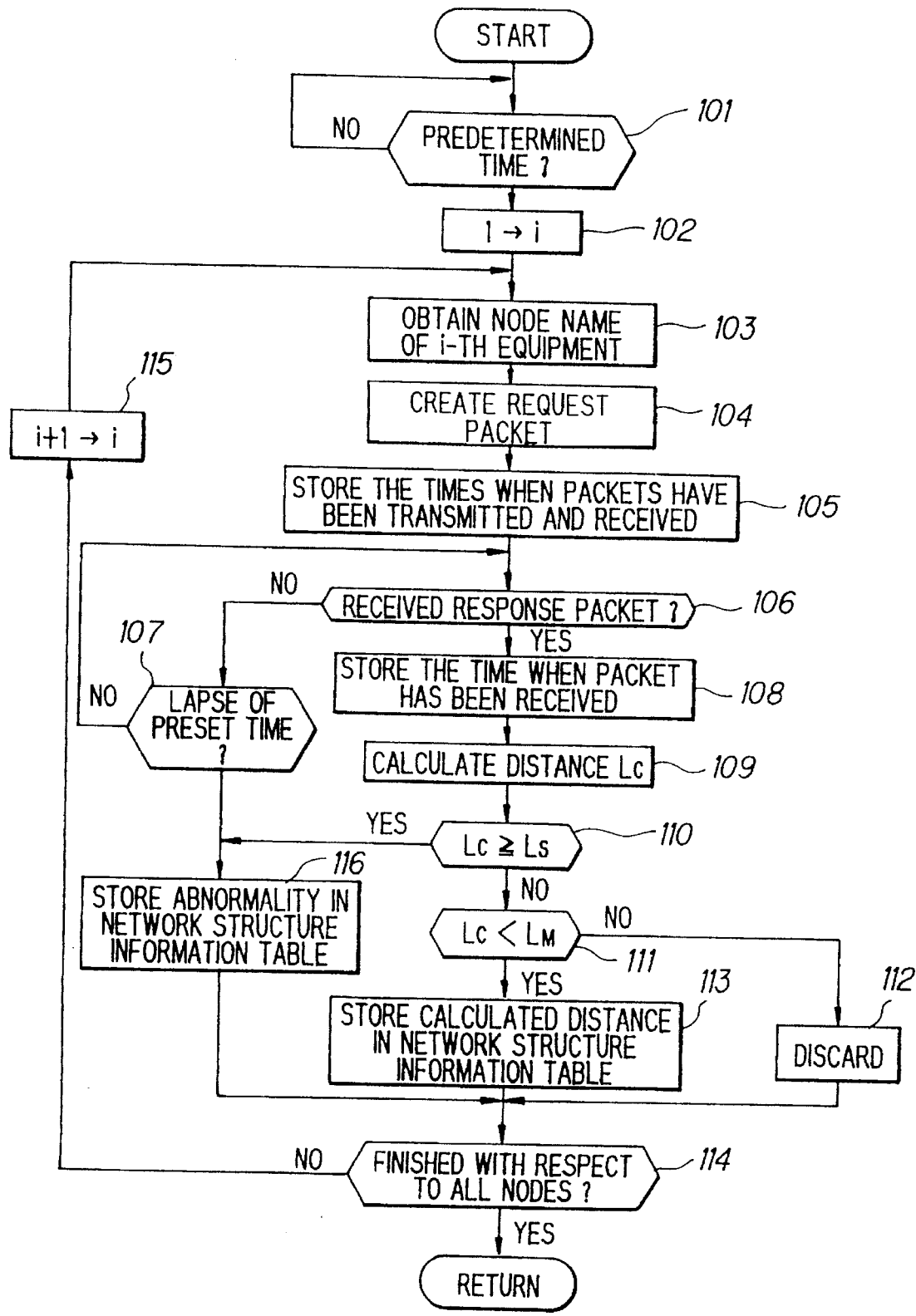
FIG. 5 is a first flow chart of the process of measuring the distance between the equipments.
Figure 6:
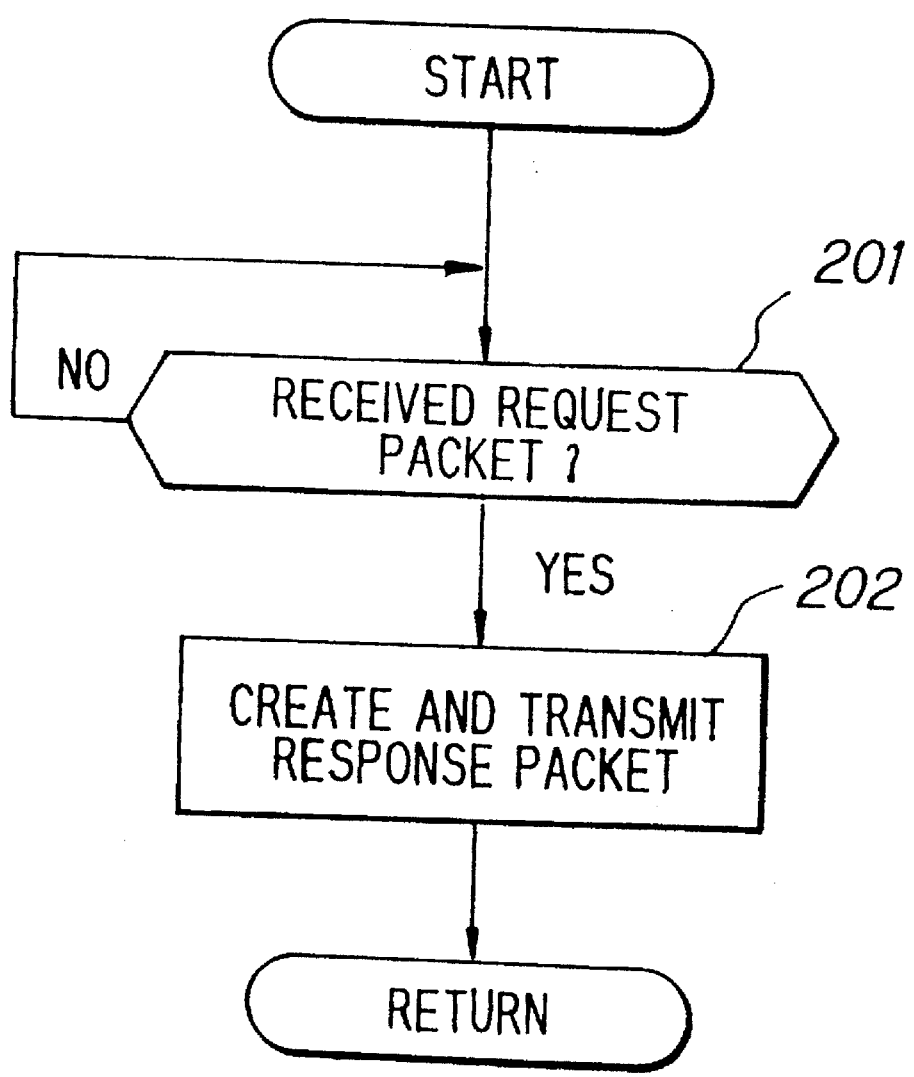
FIG. 6 is a second flow chart of the process of measuring the distance between the equipments.

FIGS. 5 and 6 are flow charts of the process of measuring the distance between the equipments in accordance with the present invention.

The control unit CNT of the equipment 11 executes a distance measurement processing at every predetermined time of interval. For this purpose, the control unit CNT checks whether or not the predetermined time has come (step 101), and when the predetermined time has come, the control unit CNT renders the value of parameter "i" equal 1 and obtains the node name (MAC address) of the i-th equipment from the storage unit NTM (steps 102, 103). The control unit CNT then creates the request packet 31 in which the destination address is the MAC address of the i-th equipment, the source address is the MAC address of the equipment 11, and the packet type is "request packet" (step 104). The control unit CNT then transmits the request packet 31 to the i-th equipment through the packet transmitter/receiver PSR and the routing portion RT. The control unit CNT also stores the time at which the request packet 31 has been transmitted in the storage unit NTM in correspondence with the node name (MAC address of the i-th equipment) (step 105). The control unit CNT may serially transmit the request packet 31 to the other equipments and receive the response packet 32 from the other equipments in the same way. However, in this embodiment, after the control unit CNT transmits the request packet 31 to one equipment and receives the response packet 32 from the same equipment so as to measure the distance between the equipment 11 and the i-th equipment, the distance between the equipment 11 and the (i+1)-th equipment is measured. This processing is serially repeated.

The i-th equipment checks whether or not the request packet 31 has been received (step 201 in FIG. 6), and if the answer is YES, the i-th equipment creates the response packet 32 and transmits it to the equipment 11 (step 202). In the response packet 32, the destination MAC address is the source MAC address of the request packet 31, the source MAC address is the MAC address of the i-th equipment, and the packet type is "response packet".

The control unit CNT of the equipment 11 checks whether or not the response packet 32 has been received (step 106), and if the answer is NO, whether or not the preset time has elapsed is judged (step 107), and if the answer is NO, the processing after the step 106 is executed. If the response packet 32 is received prior to the preset time, the time at which the response packet 32 has been received is stored in the storage unit NTM (step 108).

Thereafter, the distance Lc between the equipment 11 and the i-th equipment is calculated by computing the time interval between the time at which the request packet 31 has been transmitted and the time at which the response packet 32 has been received and multiplying the time interval by the average communication speed of the LAN (step 109). When the distance Lc is obtained, the distance Lc is compared with the limited distance Ls (step 110), and if the calculated distance is shorter than the limited distance Ls (Lc<Ls), the distance Lc is compared with the distance $L_M$ which is stored in the network structure information table NWT in correspondence with the i-th equipment (step 111).

If Lc≧LM, the calculated distance $L_c$ is discarded (step 112), while if Lc<LM, the calculated distance $L_c$ is stored in the network structure information table NWT to update the information (step 113). This is because when a collision occurs on the LAN during the transmission of a packet and the transmission is retried or the like, the reception of the response packet 32 is delayed. In other words, the distance obtained from the shortest time at which the response packet 32 has been received is stored in the information table NWT as the value approximate to the actual distance.

Judgement is then made as to whether or not the distance has been measured with respect to every equipment (step 114), and if the answer is in the negative, "1" is added to "i" (step 115) and the processing after the step 103 is repeated.

On the other hand, if the response packet 32 has not been received even after the lapse of the preset time at the step 107, the i-th equipment is judged to be abnormal (cable missing, occurrence of a trouble, etc.), and the abnormality is stored in the network structure information table NWT (step 116). Thereafter, the processing after the step 114 is repeated.

If the calculated distance Lc exceeds the limited distance Ls at the step 110, it is judged that the cable length exceeds the limited length, and the abnormality is stored in the network structure information table NWT (step 116). Thereafter, the processing after the step 114 is repeated.

In this way, the distance between the equipment 11 and each of the other equipments is obtained, as shown in the network structure information table NWT in FIG. 3. It is therefore possible to draw the network structure which corresponds to the actual layout by utilizing this distance information. It is also possible to detect a cable missing, the occurrence of a trouble or the like on the basis of judgement as to whether or not the distance between equipments is within a preset distance or whether or not the response packet 32 has been received.

When the management terminal 21 is provided, as shown in FIG. 2B, the distance measurement processing may be executed by the management terminal 21. Alternatively, the management terminal 21 may fetch the distance information (distance between the equipment 11 and each of the equipments) collected by the equipment 11 and stored in the network structure information table NWT in accordance with the telnet command of the TCP/IP protocol and utilize it.

(C) Second embodiment

Figure 7A:
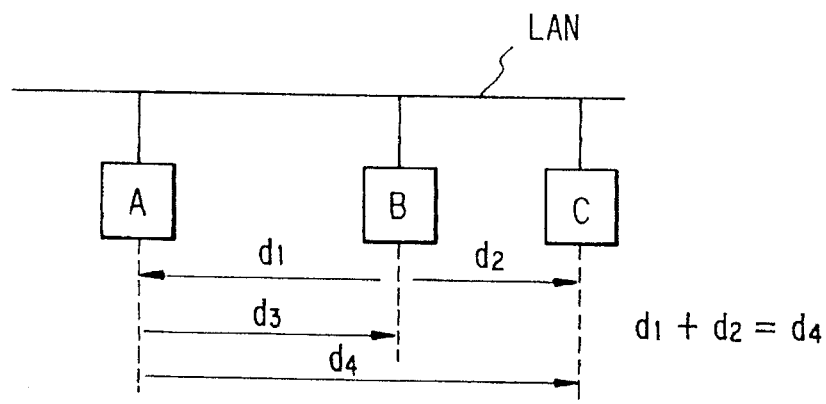
FIGS. 7A, 7B and 7C explain the positional relationship of the equipments in a bus type network.
Figure 7B:
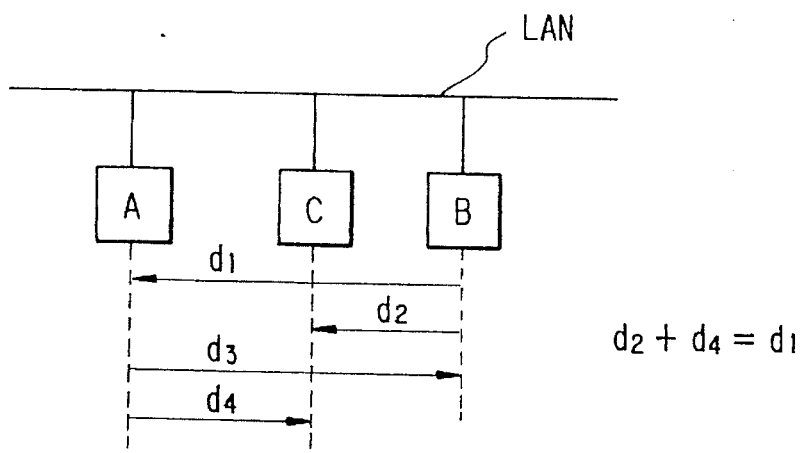
Figure 7C:
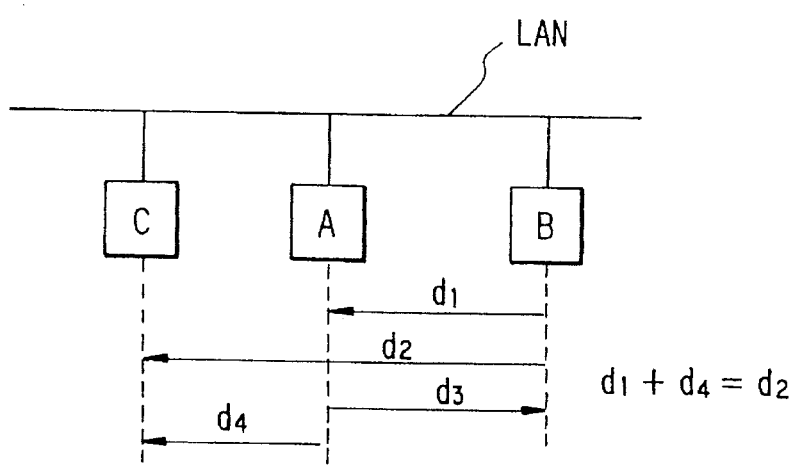

When the LAN is a ring network, since the transmission of a packet is unidirectional (e.g., clockwise), if the distance between one equipment and each of the other equipments is obtained, it is possible to seize the positional relationship between the equipments. However, in the case of a bus type network, since a packet is transmitted in both horizontal directions, it is impossible to determine merely from the distance on which side of the equipment 11 one equipment is positioned. In such a bus type network, if all the distances $d_1$ to $d_4$ between the three equipments are obtained, as shown in FIGS. 7A to 7C, their positional relationship is determined. More specifically, if it is assumed that the distance between the equipments B and A is $d_1$, the distance between the equipments B and C is $d_2$, the distance between the equipments A and B is $d_3$ (=$d_1$), and the distance between the A and C is $d_4$, (1) when $d_1+d_2=d_4$, the three equipments A, B and C have a positional relationship shown in FIG. 7A, (2) when $d_2+d_4=d_1$, the three equipments A, B and C have a positional relationship shown in FIG. 7B, and (3) when $d_1+d_4=d_2$, the three equipments A, B and C have a positional relationship shown in FIG. 7C.

Figure 8:
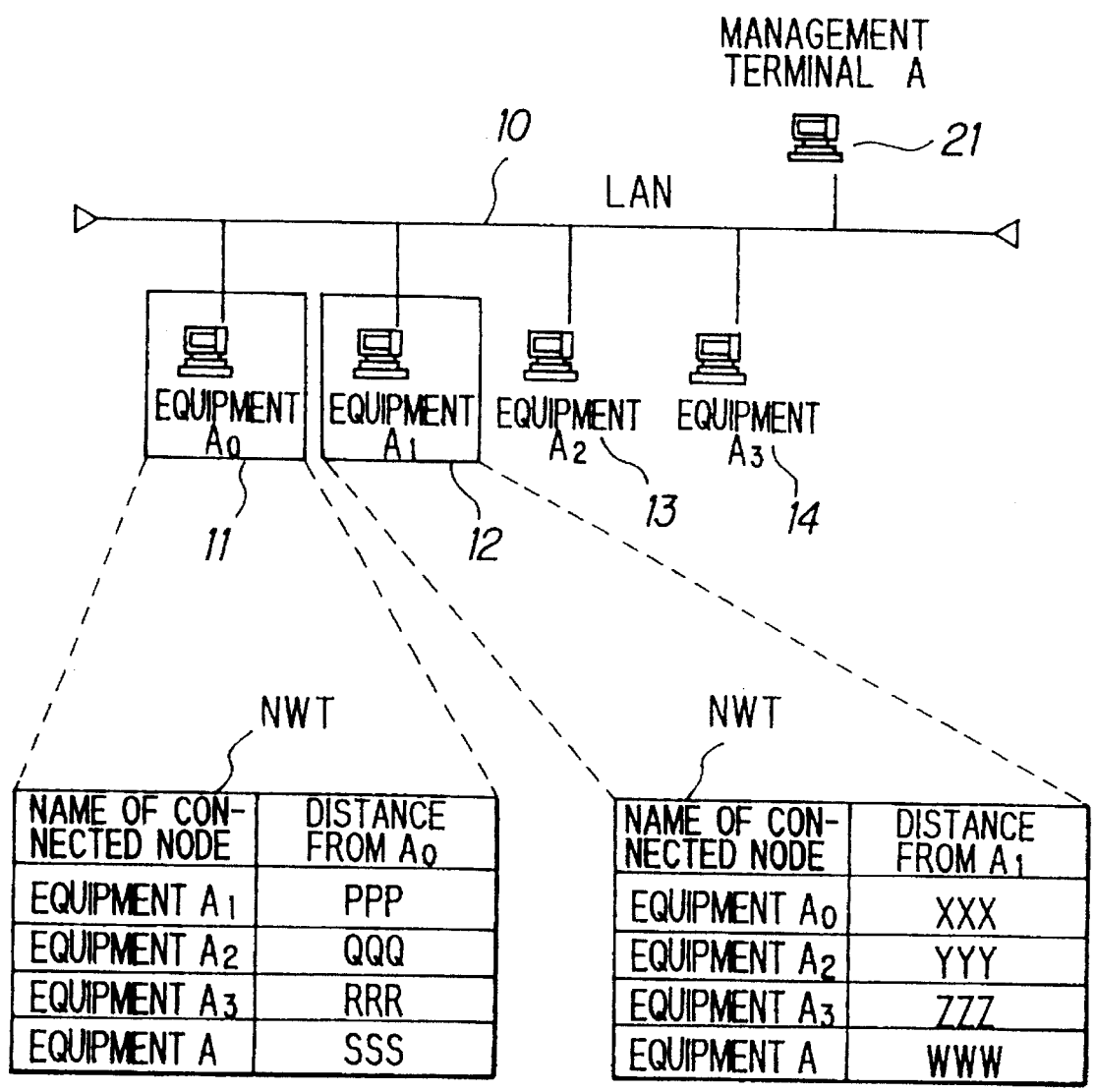
FIG. 8 is an explanatory view of a second embodiment of the present invention.

The present invention adopts this principle and when the LAN 10 in FIG. 8 is a bus type network, the distance from a second equipment 12 to each of the other equipments is measured in the same way as in the case of the first equipment 11, and this distance information is also stored in the network structure information table NWT, as shown in FIG. 8.

Figure 9:
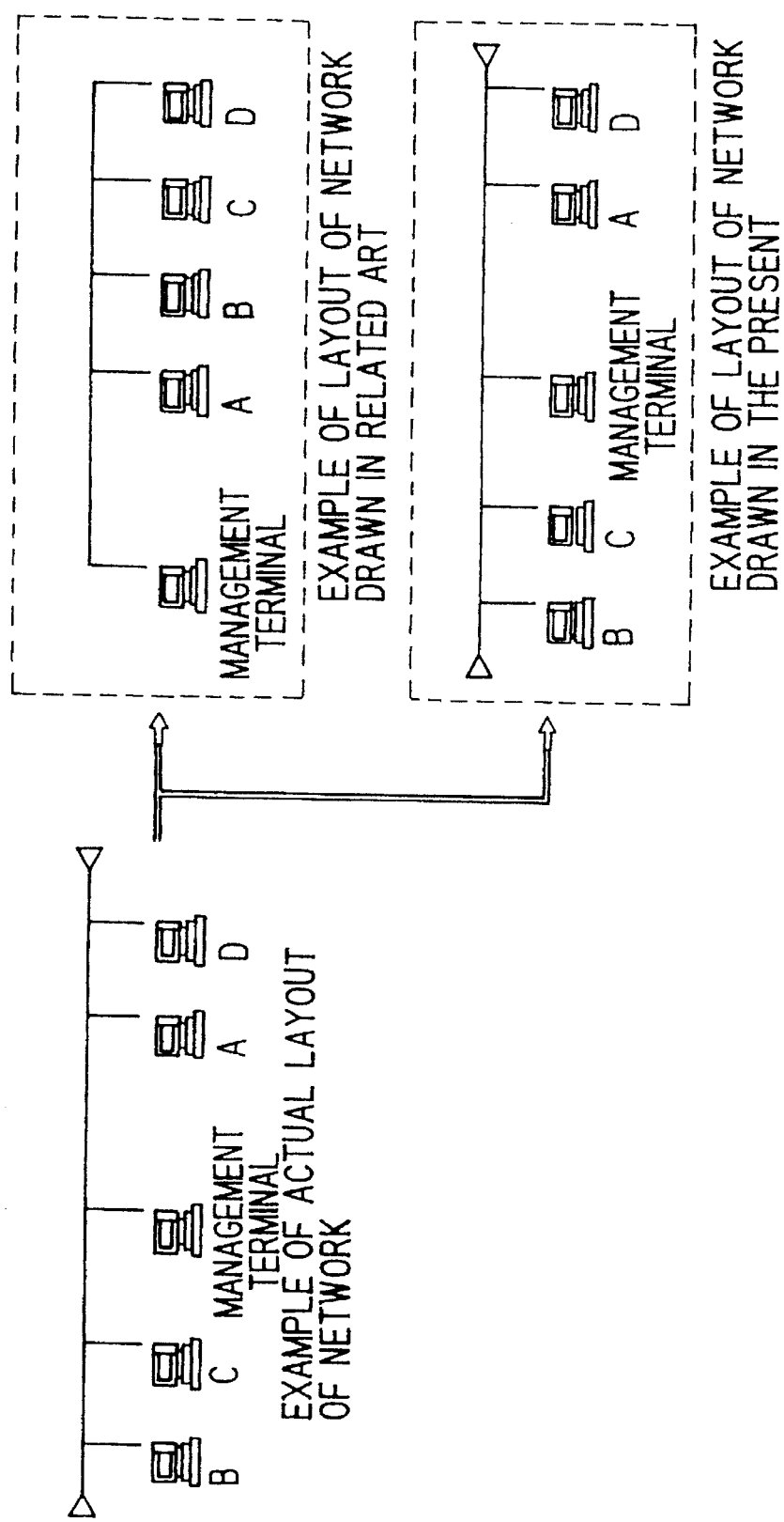
FIG. 9 is an explanatory views of the network structure drawn in accordance with the present invention.

The management terminal 21 on the LAN 10 fetches the distance information (the distance between the equipment 11 and each of the equipments and the distance between the equipment 12 and each of the equipments) collected by the first and the second equipments 11 and 12 and stored in the network structure information table NWT in accordance with the telnet command of the TCP/IP protocol and utilizes it. It is therefore possible to draw and display the network structure which corresponds to the actual layout by utilizing this distance information, as shown in FIG. 9. Thus, it is possible to correctly seize the positional relationship and the distance between the equipments in a bus LAN.

(D) Third embodiment

In the first and the second embodiments, only one LAN is used, but when the scale becomes large, a plurality of LANs are provided. LANs are connected with each other by an intermediate apparatus for LAN—LAN connection such as hub, bridge, router and brouter. If it is possible to seize the distance and the positional relationship between the equipments even in such a large-scale LAN, it is convenient.

(a) Structure

Figure 10:
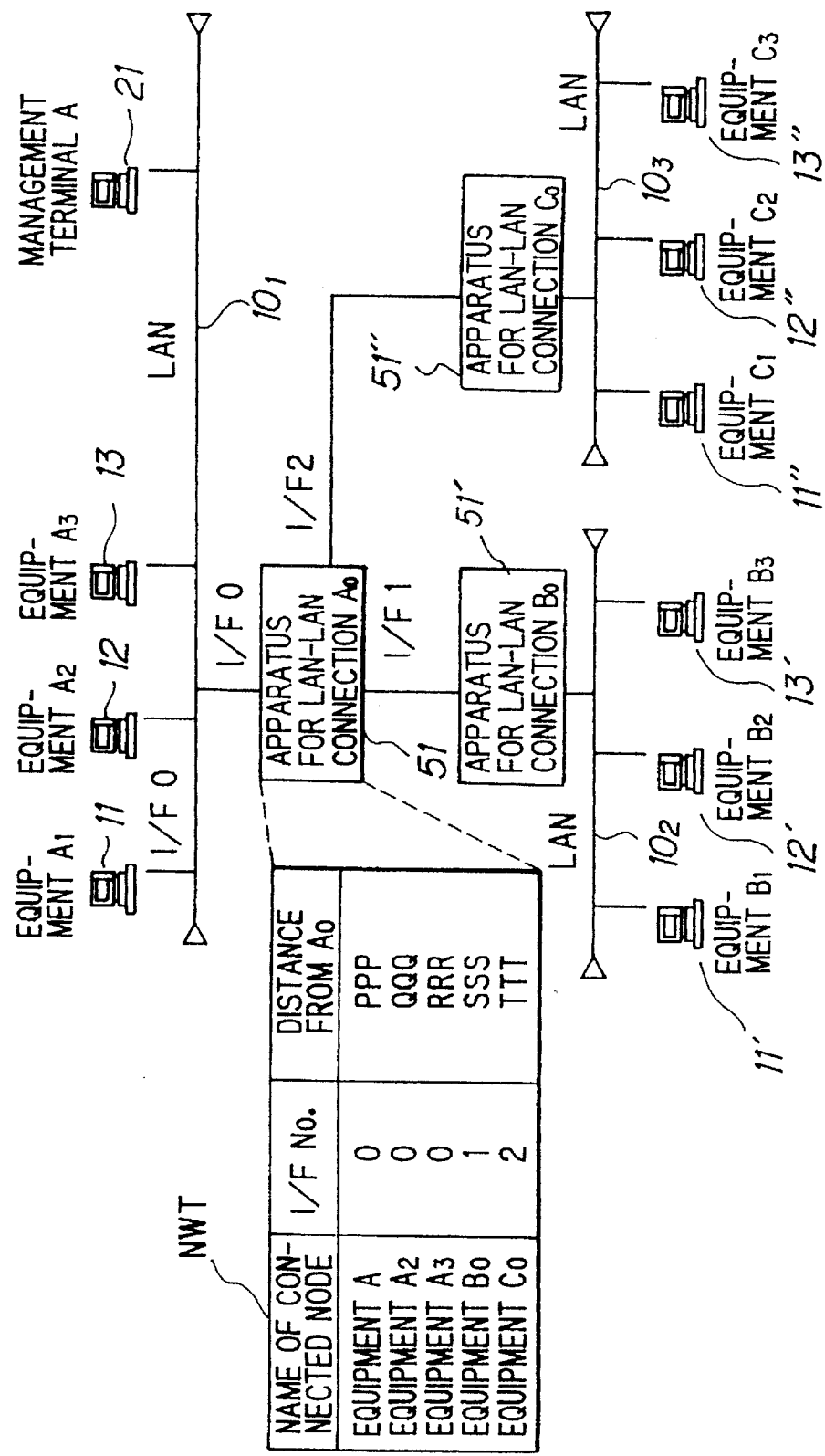
FIG. 10 shows the structure of a third embodiment of the present invention.

FIG. 10 is an explanatory view of a third embodiment of the present invention.

The reference numeral $10_1$ represents a first LAN, $10_2$ a second LAN, $10_3$ a third LAN, 11 to 13 equipments on the first LAN $10_1$, 11' to 13' equipments on the second LAN $10_2$, and 11" to 13" equipments on the third LAN $10_3$. The reference numerals 51, 51' and 51" represent intermediate apparatus for LAN—LAN connection such as hub, bridge, router and brouter.

(b) Intermediate apparatus for LAN—LAN connection

Figure 11:
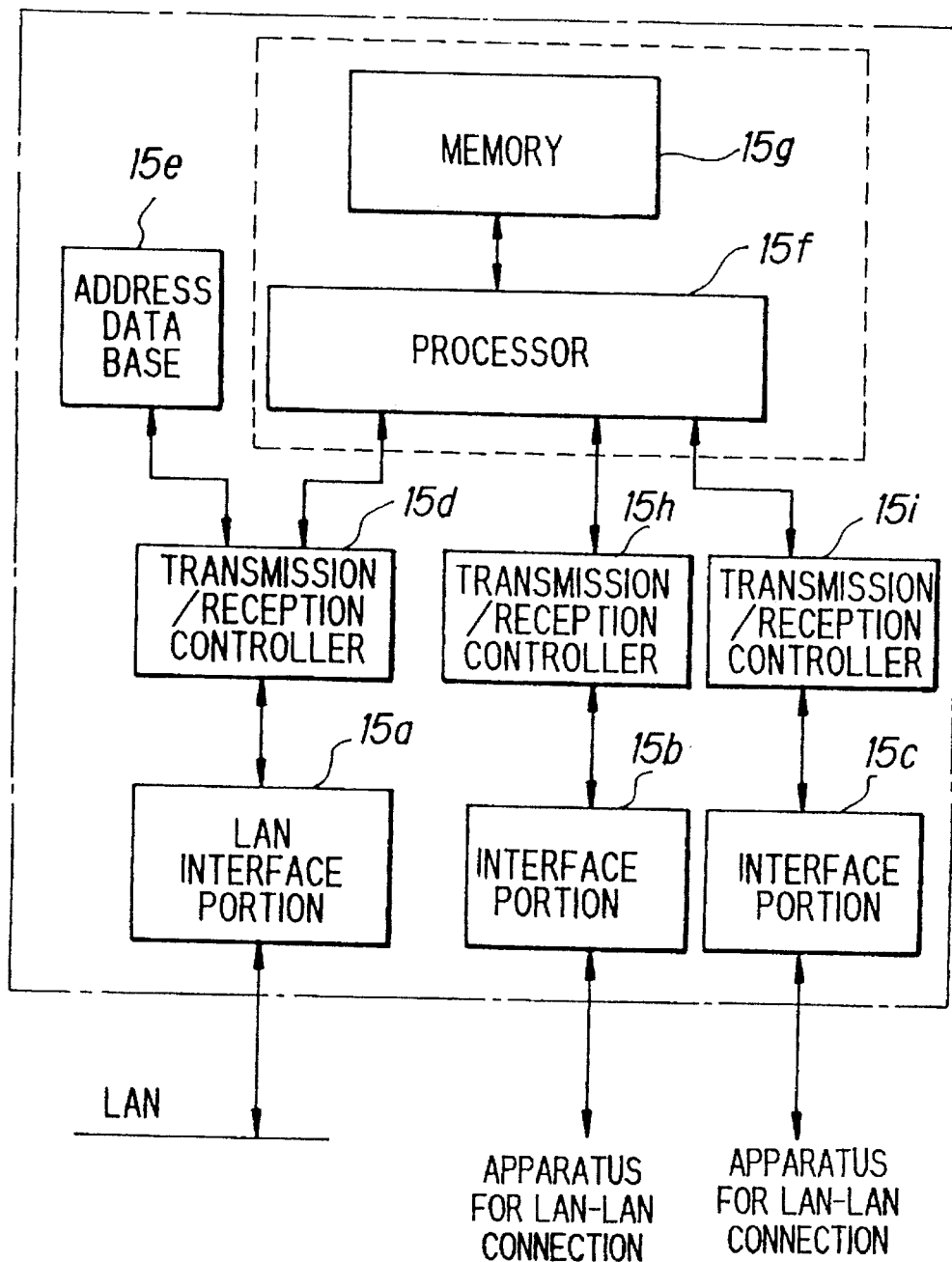
FIG. 11 shows the structure of an apparatus for LAN—LAN connection.

As shown in FIG. 11, the intermediate apparatus for LAN—LAN connection is provided with a LAN interface portion 15a which is connected to the LAN, interface portions 15b and 15c which are connected to the adjacent intermediate apparatus for LAN—LAN connection, a transmission/reception controller 15d on the LAN, an address data base portion 15e for storing the MAC addresses of the equipments on the LAN under its command, a processor 15f, a memory 15g, and transmission/reception controllers 15h and 15i for the adjacent intermediate apparatus.

When a transmission packet is transmitted from an equipment on the LAN, the LAN interface portion 15a of the intermediate apparatus fetches the packet and inputs it to the transmission/reception controller 15d. The transmission/reception controller 15d judges whether or not the MAC destination address exists in the address data base 15e, if the answer is NO, the transmission/reception controller 15d inputs the received packet into the processor 15f. On the other hand, if the destination address is in the address data base 15e, since it is the packet addressed to another equipment of the LAN, the transmission/reception controller 15d discards the received packet. The transmission/reception controller 15d also judges whether or not the source address SA exists in the address data portion 15e, and if the answer is NO, the controller 15d registers the source address SA in the address data base 15e.

The processor 15f buffers the packet supplied from the transmission/reception controller 15d in the memory 15g and obtains the destination address DA', which is a network address, and starts the transmission/reception controller 15h or 15i which corresponds to the destination address. The started transmission/reception controller serially reads the packets from the memory 15g and transmits the read packets to the adjacent intermediate apparatus through the interface portions 15b or 15c. In this way, the transmission packet is fetched by the intermediate apparatus on the destination side.

The transmission/reception controller 15h (15i) of the intermediate apparatus for LAN—LAN connection on the destination side store the packets which are fetched through the interface portion 15b (15c) in the memory 15g. The transmission/reception controller 15d on the LAN side reads the received packet from the memory 15g and transits it to the LAN through the LAN interface portion 15a. The equipment on the LAN which has the same MAC address as the destination MAC address takes in the packet.

The processor 15f of each of the intermediate apparatus 51, 51', and 51" is provided with a function equal to that of the control unit CNT shown in FIG. 3 with respect to distance measurement processing, so as to measure the distance between the intermediate apparatus and each equipment on the LAN under its command and the distance between the intermediate apparatus and the adjacent intermediate apparatus. The memory 15g can store (1) the contents of the storage unit NTM shown in FIG. 3, in other words, the data on the time at which a request packet has been transmitted and the time at which a response packet has been received in correspondence with the destination node (MAC address), and (2) the network structure information table NWT shown in FIG. 3. In this case, the network structure information table NWT stores the interface names (I/F0, I/F1, I/F2) as well as the distance from the intermediate apparatus in accordance with the name of the connected node (MAC address).

The processor 15f of each of the intermediate apparatuses 51, 51', and 51" measures the distance between the intermediate apparatus and each equipment on the LAN under its command and the distance between the intermediate apparatus and the adjacent intermediate apparatus. In this way, the network structure information table NWT shown in FIG. 10 is created in the memory 15g of each of the intermediate apparatuses 51, 51', and 51". The network structure information table NWT in each of the intermediate apparatuses 51, 51', and 51" is taken in by the management terminal 21 which is directly connected to the corresponding intermediate apparatuses or on the same LAN at the time (1) when the key is operated at the management terminal 21;

(2) when the entire or a part of the network is changed; or (3) when a preset time has elapsed.

(c) Collection of network structure information table NWT

Figure 12:
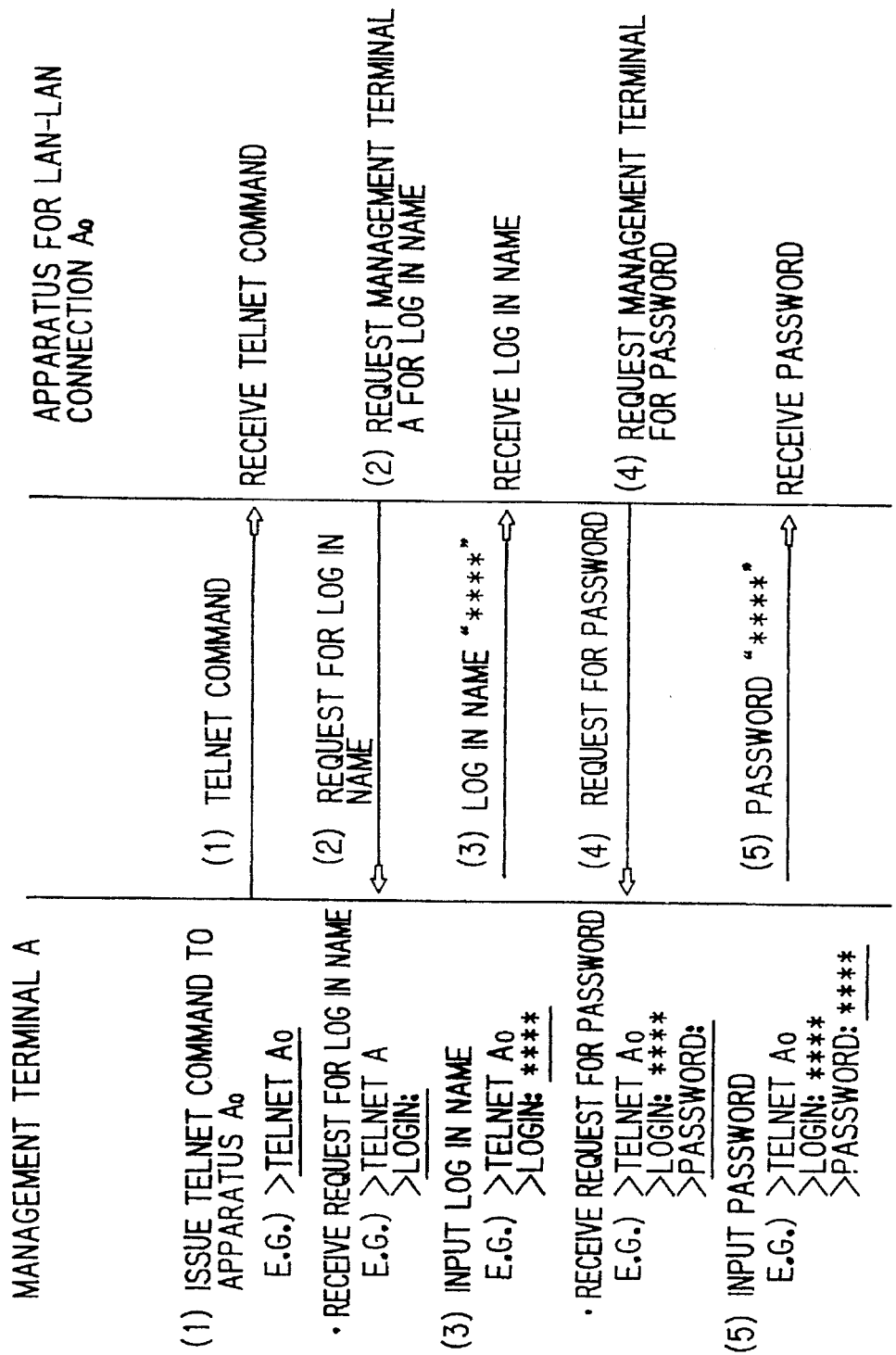
FIGS. 12 to 14 explain the process of taking the network structure information table into the management equipment.
Figure 13:
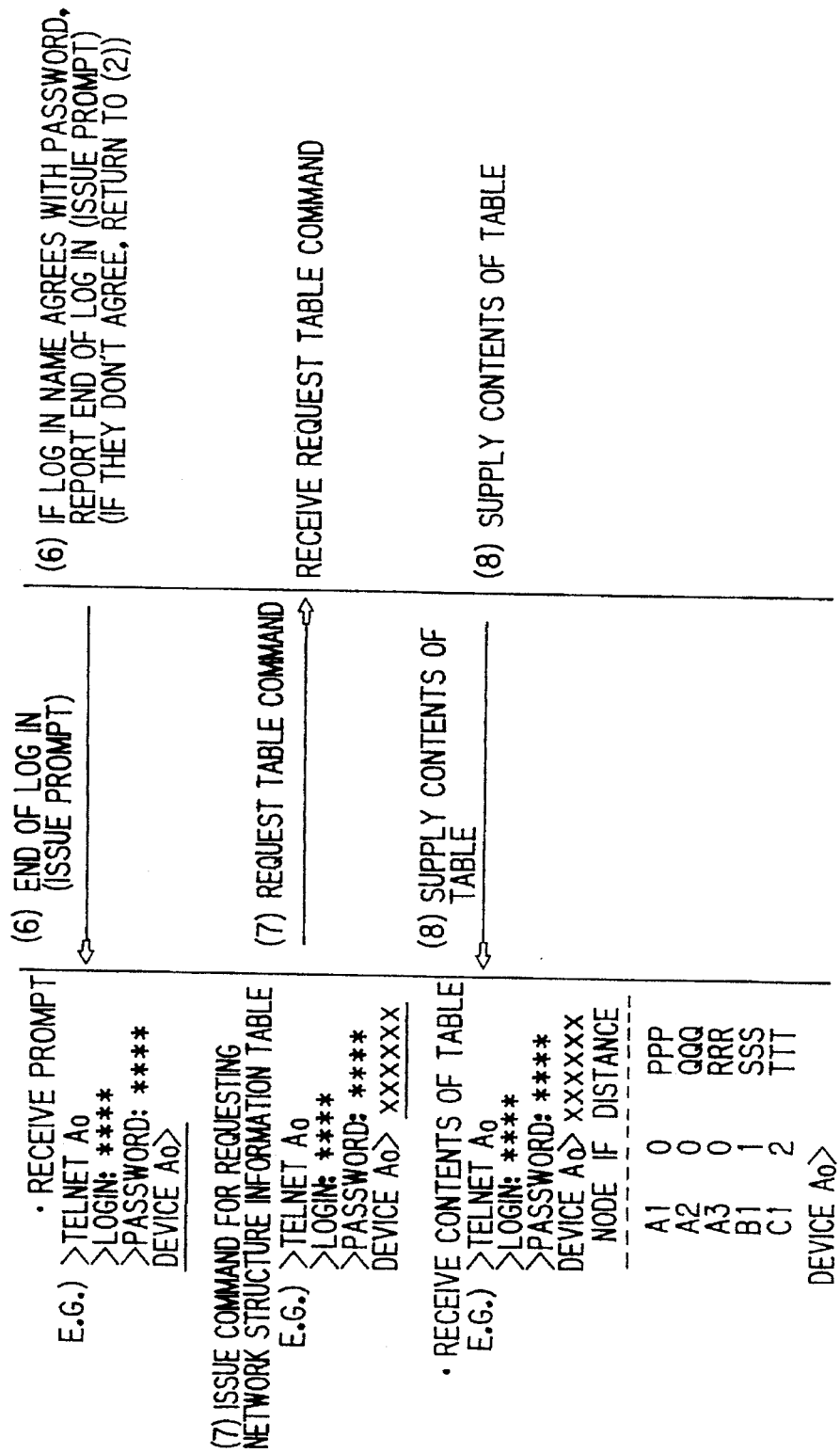
Figure 14:
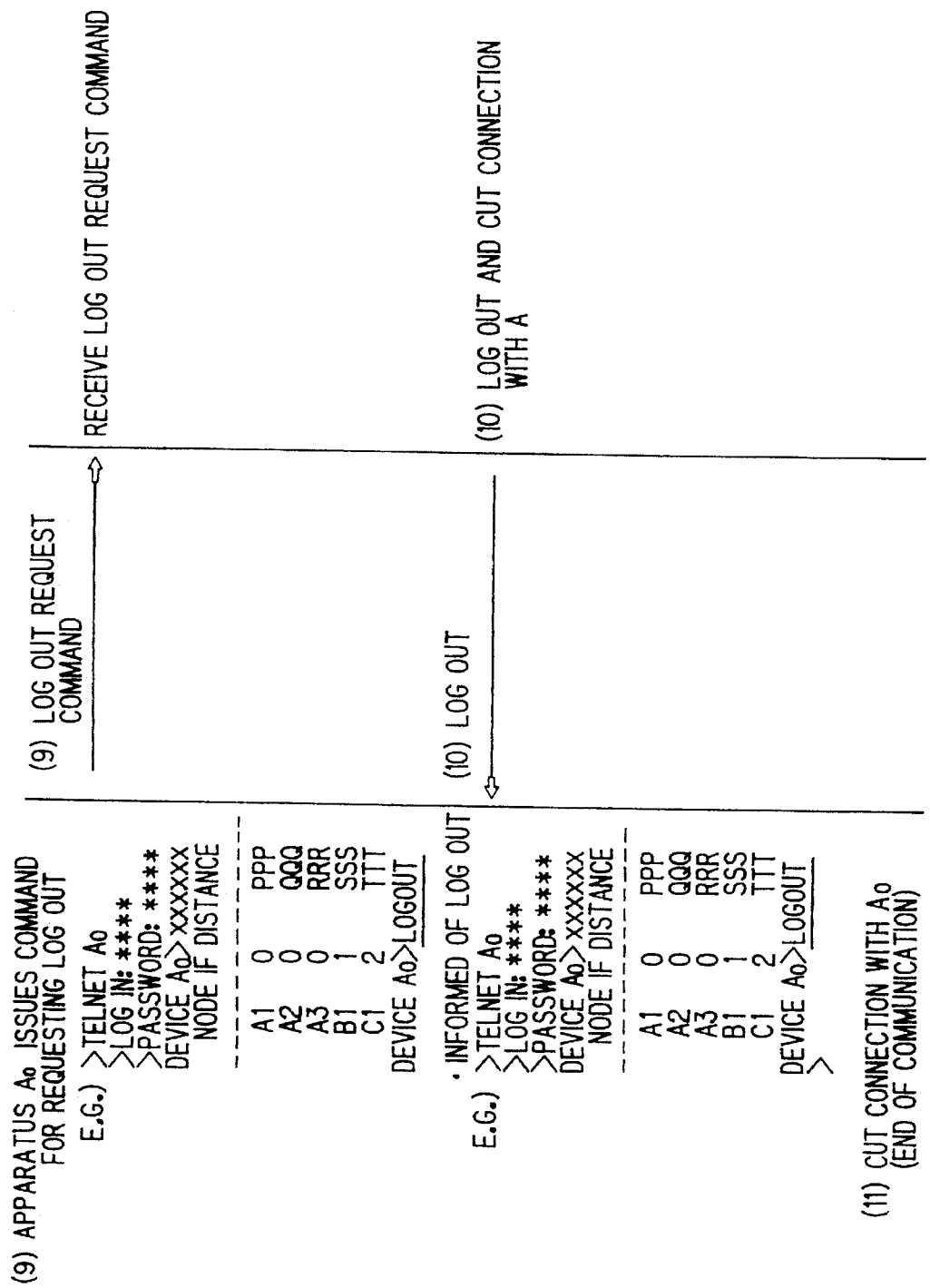

FIGS. 12 to 14 are explanatory views of the process of taking the network structure information table NWT from each intermediate apparatus into the management terminal 21 by the key operation in accordance with the telnet command of the TCP/IP protocol.

It is now assumed that the management terminal 21 already knows that the intermediate apparatus on the network are $A_0$, $B_0$ and $C_0$.

(1) The management terminal 21 first issues a telnet command (>telnet $A_0$) to the intermediate apparatus $A_0$ 51.

(2) When the intermediate apparatus $A_0$ 51 receives the telnet command, it requests the management terminal 21 to input the log in name.

(3) In response to the request, the management terminal 21 inputs a log in name (>log in:****).

(4) When the intermediate apparatus $A_0$ 51 receives the log in name, it request the management terminal 21 to input a password.

(5) In response to the request, the management terminal 21 inputs a password (>password:****).

(6) If the log in name agrees with the password, the intermediate apparatus $A_0$ 51 reports the end of log in (issues a prompt). If the log in name does not agree with the password, the process returns to the step (2).

(7) When the management terminal 21 receives the prompt, it issues a command (>Device $A_0$) for requesting the network structure information table NWT.

(8) When the intermediate apparatus $A_0$ 51 receives the request table command, it supplies the contents of the network structure information table NWT to the management terminal 21.

(9) When the management terminal 21 receives the contents of the information table NWT, it issues a command for requesting log out.

(10) In response to the request, the intermediate apparatus $A_0$ 51 logs out, and then cuts the connection with the management terminal 21.

(11) When the management equipment 21 is informed of the log out, it cuts the connection with the intermediate apparatus $A_0$ 51.

(E) Fourth embodiment

When the LAN is a ring type network, if the distance between one equipment and each of the other equipments is obtained, it is possible to seize the positional relationship of the equipments, as explained in the first embodiment. In a bus type network, however, it is impossible to determine merely from the distance on which side of the equipment 11 one equipment is positioned.

Figure 15:
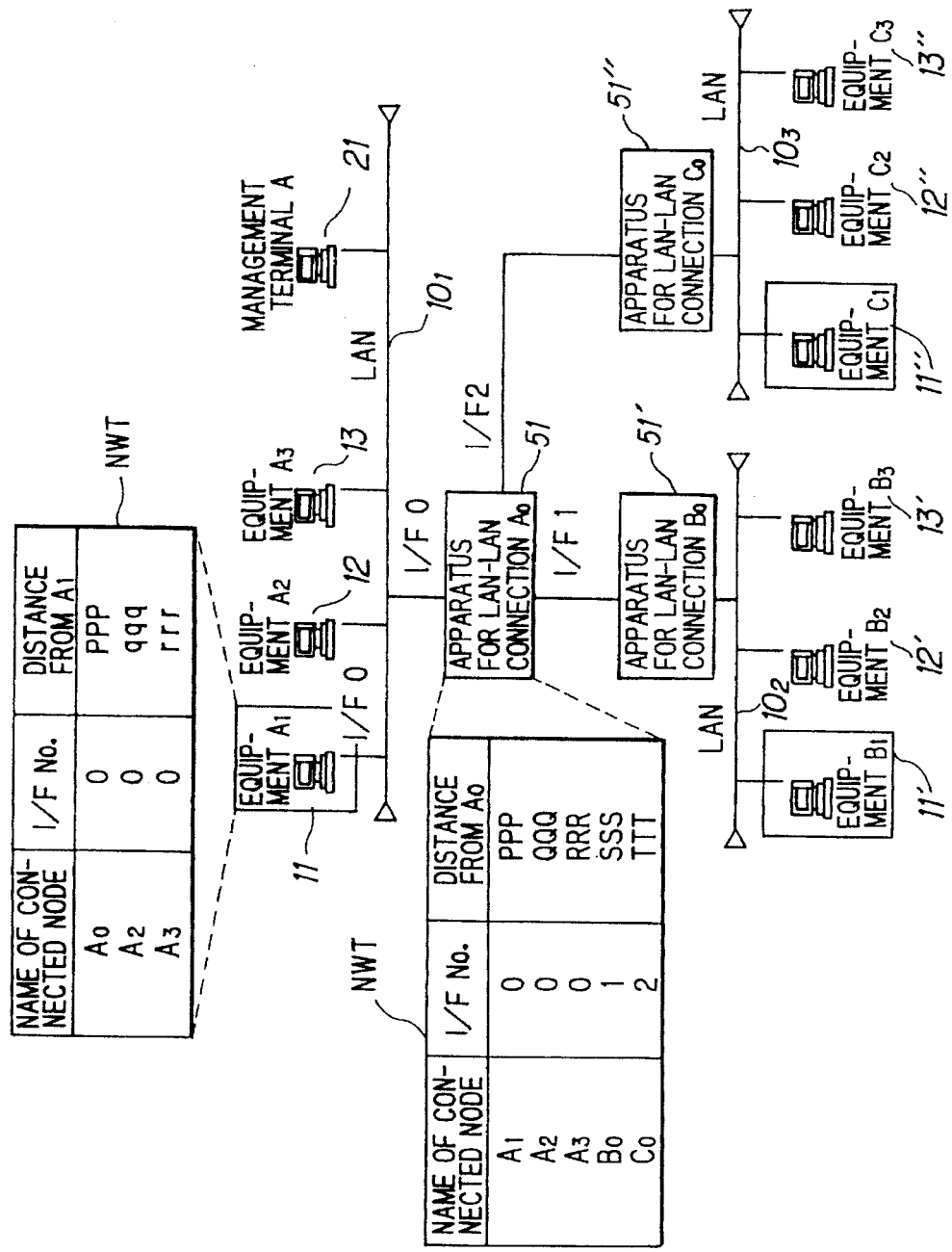
FIG. 15 is an explanatory view of a fourth embodiment of the present invention.
Figure 16A:
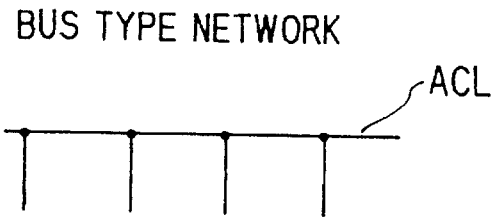
FIG. 16 explains the wiring topology of a LAN.
Figure 16B:
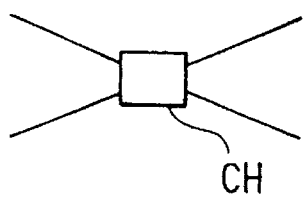
Figure 16C:
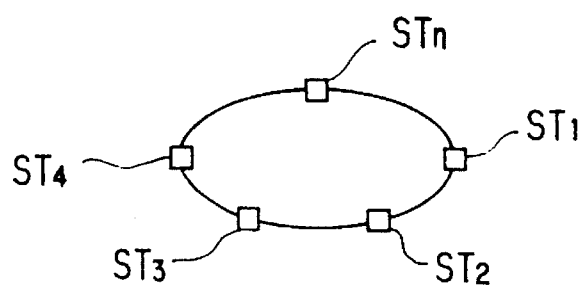
Figure 17A:
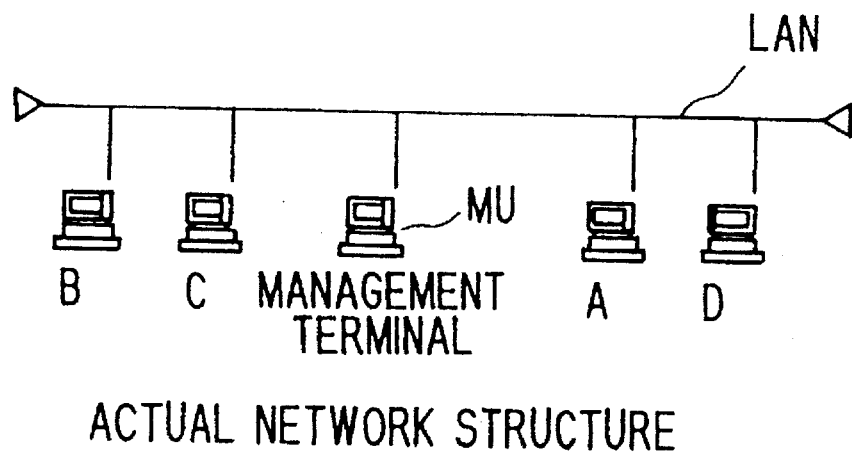
FIG. 17A and 17B explain the problems in the related art.
Figure 17B:
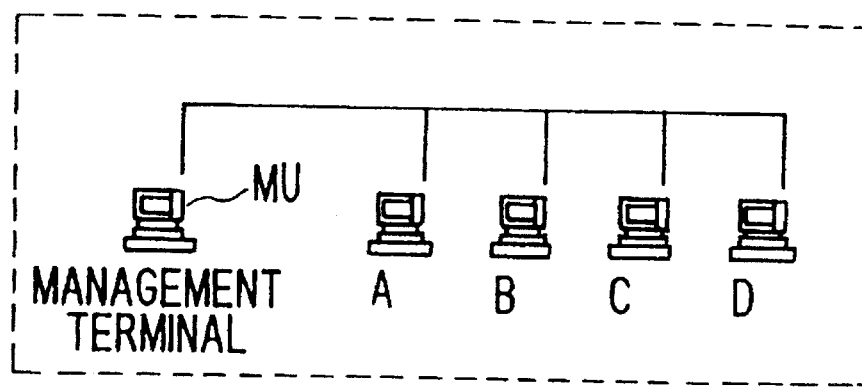

FIG. 15 shows the structure of a fourth embodiment of the present invention in which a plurality of LANs including a bus type network are connected.

The equipment 11 on the LAN $10_1$ measures the distance between the equipment 11 and each of the other equipments $A_2$, $A_3$ and the intermediate apparatus $A_0$ 51 for LAN—LAN connection and stores the distance information in the network structure information table NWT. The intermediate apparatus $A_0$ 51 measures the distance between the apparatus $A_0$ 51 and each of the equipments $A_1$ to $A_3$ on the LAN $10_1$ and the other intermediate apparatus $B_0$, $C_0$ for LAN—LAN connection, and stores the distance information in the network structure information table NWT. The management terminal 21 on the LAN 10 fetches the distance information (network structure information table NWT) collected by the intermediate apparatus 51 and the equipments 11. It is therefore possible to correctly seize the positional relationship and the distance of the equipments even in a bus type network and display the network structure which corresponds to the actual layout. If both LANs $10_2$ and $10_3$ are bus networks, the equipments 11' and 11" measure the distance between the respective equipments and each of the other equipments on the LANs under their command and seize the respective distances and positional relationships.

As described above, according to the present invention, since it is possible to obtain the distance between the equipments, it is possible to draw the network structure which corresponds to the actual layout by utilizing the distance information. In addition, it is possible to judge whether or not the distance between equipments is within a preset distance. It is also possible to detect cable missing, the occurrence of a trouble or the like on the basis of whether or not the response packet has been received.

According to the present invention, it is possible to correctly seize the positional relationship and the distance between the equipments even in a bus type network.

In addition, according to the present invention, when a plurality of LANs are connected with each other through an intermediate apparatus for LAN—LAN connection, the intermediate apparatus calculates the distance between the equipments on the LAN under its command and the adjacent intermediate apparatus and stores the distance information in the memory, and the management terminal on a LAN seizes the distance and the positional relationship between the equipments on the LANs by reference to the distance information. Thus, it is possible to obtain the distance and the positional relationship between the equipments even in a system containing an intermediate apparatus such as hub, bridge and router.

As many apparently widely different embodiments of the present invention can be made without departing from the spirit and scope thereof, it is to be understood that the invention is not limited to the specific embodiment thereof except as defined in the appended claims.

What is claimed is:

1. A method of measuring the distance between the equipments on a LAN comprising the steps of:

transmitting a request packet periodically from a first equipment to each of the other equipments;

transmitting a response packet from each equipment which has received said request packet to said first equipment;

calculating by said first equipment a distance between said first equipment and each of the other equipments on the basis of the time at which said request packet has been transmitted and the time at which said response packet has been received; and storing the calculated distance in a memory, wherein said step of storing said calculated distance includes the steps of:

comparing said calculated distance with a distance previously stored in said memory;

updating said distance stored in said memory when said calculated distance is shorter; and discarding said calculated distance and holding said distance stored in said memory when said calculated distance is longer.

2. A method of measuring the distance between the equipments on a LAN according to claim 1, further comprising the step of drawing the network structure of said LAN on a display screen on the basis of the distance between the equipments.

3. A method of measuring the distance between the equipments on a LAN according to claim 1, wherein when said LAN is constituted by a bus network, said method further comprises the steps of:

calculating by a second equipment on the LAN the distance between said second equipment and each of the other equipments; and obtaining positional relationship and the distance between the equipments on the basis of the distance calculated by said first equipment and the distance calculated by said second equipment.

4. A method of measuring the distance between the equipments on a LAN according to claim 3; further comprising the step of drawing the network structure of said LAN on a display screen on the basis of the positional relationship and the distance between the equipments.

5. A method of measuring the distance between the equipments on a plurality of LANs connected with each other through an intermediate apparatus for LAN—LAN connection, comprising the steps of:

transmitting a request packet periodically from each intermediate apparatus for LAN—LAN connection to each equipment on the LAN under its command and each adjacent intermediate apparatus;

transmitting a response packet from each equipment and each adjacent intermediate apparatus which has received said request packet to each intermediate apparatus which has transmitted said request packet;

calculating by each intermediate apparatus the distance between said intermediate apparatus and each equipment on the LAN under its command and the distance between said intermediate apparatus and each adjacent intermediate apparatus on the basis of the time at which said request packet has been transmitted and the time at which said response packet has been received;

storing the calculated distances in a memory; and calculating by a management terminal on a LAN the distance between the equipments on each LAN on the basis of the distance information collected by each intermediate apparatus.

6. A method of measuring the distance between the equipments on a plurality of LANs according to claim 5, wherein said step of storing the calculated distances in a memory includes the steps of:

comparing said calculated distance with a distance previously stored in said memory;

updating said distance stored in said memory when said calculated distance is shorter; and discarding said calculated distance and holding said distance stored in said memory when said calculated distance is longer.

7. A method of measuring the distance between the equipments on a plurality of LANs according to claim 5, further comprising the step of drawing the network structure of said LANs on a display screen on the basis of the distance between the equipments.

8. A method of measuring the distance between the equipments on a plurality of LANs according to claim 5, wherein when said LANs are constituted by a bus network, said method further comprises the steps of:

calculating by one equipment on each LAN the distance between said one equipment and each of the other equipments; and obtaining positional relationship and the distance between the equipments on the basis of the distances calculated by each intermediate apparatus for LAN—LAN connection and the distance calculated by said one equipment.

9. A method of measuring the distance between the equipments on a plurality of LANs according to claim 5, further comprising the step of drawing the network structure of said LANs on a display screen on the basis of the positional relationship and the distance between the equipments.

10. A distance measuring apparatus in one of equipments for measuring the distance between the equipments on a LAN, said apparatus comprising:

a transmitter/receiver for transmitting a request packet periodically to the other equipments and receiving a response packet to said request packet from the other equipments;

a storage portion for storing the time at which said request packet has been transmitted and the time at which said response packet has been received in correspondence with a name of an address equipment a distance calculating portion for calculating the distance to each of the other equipments on the basis of the time at which said request packet has been transmitted and the time at which said response packet has been received; and a storage unit for storing the calculated distance in correspondence with the name of the address equipment;

wherein said distance calculating portion compares said calculated distance with the distance stored in said storage unit, and updates said distance stored in said storage unit only when said calculated distance is shorter.

* * * * *